(12) United States Patent
Guo (10) Patent No.: US 8,973,992 B2
(45) Date of Patent: Mar. 10, 2015

(54) CHILD SAFETY SEAT

(71) Applicant: Wonderland Nurserygoods Company Limited, Central (HK)

(72) Inventor: Zheng-Wen Guo, Central (HK)

(73) Assignee: Wonderland Nurserygoods Company Limited, Central (HK)

( * ) Notice: Subject to any disclaimer, the term of this patent is extended or adjusted under 35 U.S.C. 154(b) by 128 days.

(21) Appl. No.: 13/802,059

(22) Filed: Mar. 13, 2013

(65) Prior Publication Data

US 2014/0084649 A1    Mar. 27, 2014

(30) Foreign Application Priority Data

Sep. 21, 2012  (CN) .......................... 2012 1 0361731

(51) Int. Cl.
*A47D 1/10*   (2006.01)
*B60N 2/26*   (2006.01)
*B60N 2/28*   (2006.01)

(52) U.S. Cl.
CPC .............. *B60N 2/265* (2013.01); *B60N 2/2806* (2013.01); *B60N 2/2866* (2013.01)
USPC ...................................... 297/256.1; 24/68 R (58) Field of Classification Search
USPC .......................................... 297/250.1, 256.1
See application file for complete search history.

(56) References Cited

U.S. PATENT DOCUMENTS

| | | | | |
|---|---|---|---|---|
| 5,186,520 | A * | 2/1993 | Whitaker et al. | 297/468 |
| 6,672,664 | B2 * | 1/2004 | Yanaka et al. | 297/256.16 |
| 8,262,161 | B2 * | 9/2012 | Fritz et al. | 297/253 |
| 8,573,695 | B2 * | 11/2013 | Van Geer et al. | 297/256.16 |
| 2005/0184567 | A1 * | 8/2005 | Carpenter et al. | 297/256.16 |
| 2011/0140491 | A1 * | 6/2011 | Williams et al. | 297/256.16 |
| 2011/0254331 | A1 * | 10/2011 | Nagelski et al. | 297/216.11 |

* cited by examiner

*Primary Examiner* — Sarah B McPartlin
(74) *Attorney, Agent, or Firm* — Christensen O'Connor Johnson Kindness PLLC (57) ABSTRACT

A child safety seat includes a seat base and a safety-belt clamping device disposed on the seat base, and is disposed to a car seat by a safety belt. The safety-belt clamping device includes a bottom seat, a rotatable clamping arm connected pivotally to an end of the bottom seat, and a retainer mounted to an opposite end of the bottom seat and retaining releasably a free end of the rotatable clamping arm thereon. The seat base has a mounting groove. The bottom seat is disposed fixedly on the seat base. The rotatable clamping arm and the retainer are disposed within the mounting groove. When the rotatable clamping arm is retained on the retainer, the safety belt is clamped between the rotatable clamping arm and two sidewalls defining the mounting groove.

16 Claims, 12 Drawing Sheets

CHILD SAFETY SEAT

CROSS-REFERENCE TO RELATED APPLICATION

This application claims priority of Chinese 201210361731.X, filed on Sep. 21, 2012.

BACKGROUND OF THE INVENTION

1. Field of the Invention

This invention relates to a child safety seat, and more particularly to a child safety seat having a safety-belt clamping device.

2. Description of the Related Art

Various child safety seats having different designs are available. However, most child safety seats are fastened directly to a car seat by a safety belt without assistance of other auxiliary devices. This results in insufficient stability and troublesome assembly and disassembly.

SUMMARY OF THE INVENTION

The object of this invention is to provide a child safety seat with a safety-belt clamping device.

According to this invention, a child safety seat includes a seat base and a safety-belt clamping device disposed on the seat base, and is disposed to a car seat by a safety belt. The safety-belt clamping device includes a bottom seat, a rotatable clamping arm connected pivotally to an end of the bottom seat, and a retainer mounted to an opposite end of the bottom seat and retaining releasably a free end of the rotatable clamping arm thereon. The seat base has a mounting groove. The bottom seat is disposed fixedly on the seat base. The rotatable clamping arm and the retainer are disposed within the mounting groove. When the rotatable clamping arm is retained on the retainer, the safety belt is clamped between the rotatable clamping arm and two sidewalls defining the mounting groove.

As such, the safety-belt clamping device can be operated easily to clamp the safety belt to thereby secure the child safety seat effectively on a car seat. Furthermore, the safety-belt clamping device can be removed easily from the safety belt, and can be concealed within a lower end portion of the child safety seat to maintain a good outer appearance of the child safety seat.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 1:
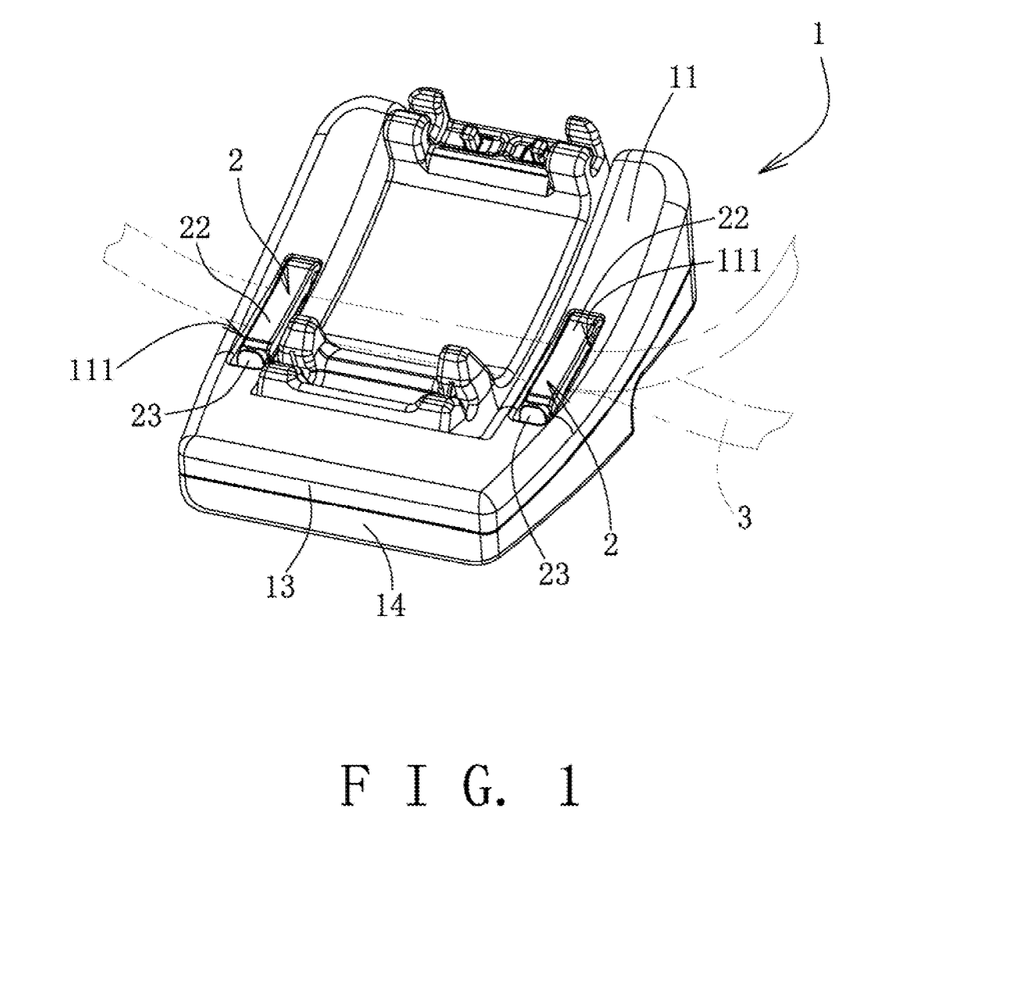
FIG. 1 is a fragmentary perspective view of the first preferred embodiment of a child safety seat according to this invention.
Figure 2:
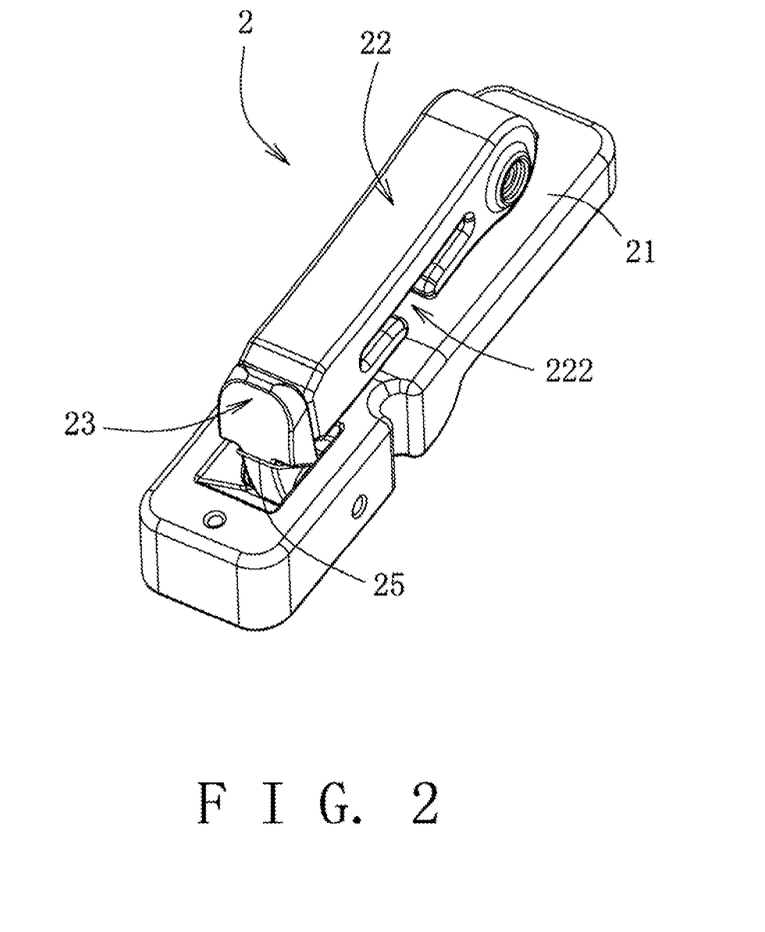
FIG. 2 is a perspective view of a safety-belt clamping device of the first preferred embodiment.
Figure 3:
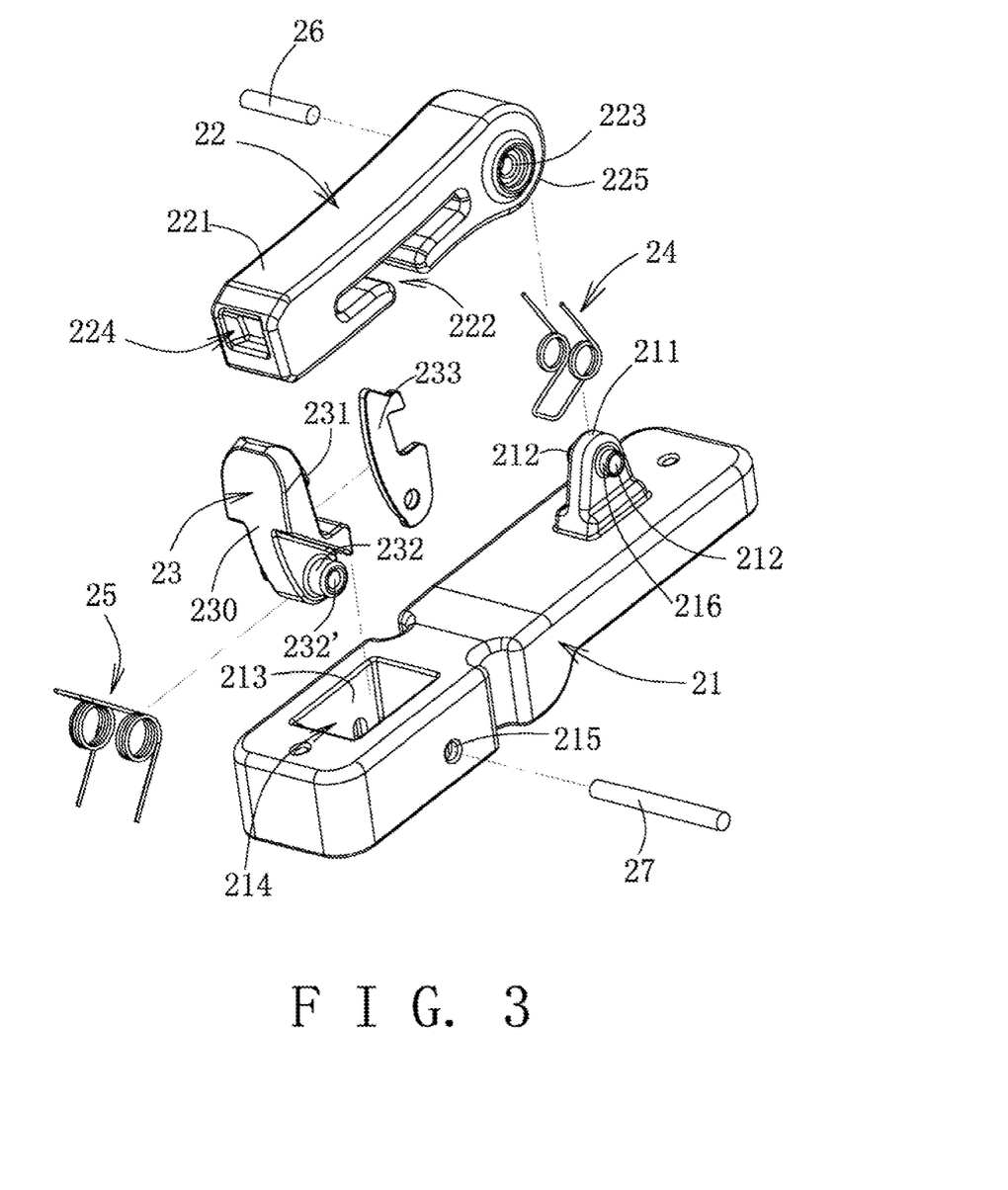
FIG. 3 is an exploded perspective view of the safety-belt clamping device of the first preferred embodiment.

Referring to FIGS. 1, 2, and 3, the first preferred embodiment of a child safety seat according to this invention is adapted to be disposed on a car seat (not shown), and is fastened to the car seat using a three-point safety belt 3.

The child safety seat includes a seat base 1, a seat body (not shown), and two safety-belt clamping devices 2. The seat body is connected removably to the seat base 1 in a known manner. The seat base 1 includes an upper housing 13 and a lower housing 14. The upper housing 13 is connected directly to the seat body of the child safety seat. Each safety-belt clamping device 2 includes: an elongate bottom seat 21 including a pivot seat 211 disposed on a top surface of an end thereof, the pivot seat 211 including two sidewalls each having a first shaft tube 216 defining a first pivot hole 212; a rotatable clamping arm 22 connected pivotally to the pivot seat 211 by a first pivot pin 26 extending through the first pivot holes 212 of the sidewalls of the pivot seat 211, the rotatable clamping arm 22 being pivotable relative to the bottom seat 21 between a clamping position shown in FIG. 8 whereat a free end 221 of the rotatable clamping arm 22 is proximate to the bottom seat 21, and a non-clamping position shown in FIG. 7 whereat the free end 221 is distal from the bottom seat 21; a first torsion spring 24 disposed between the rotatable clamping arm 22 and the pivot seat 211 for biasing the rotatable clamping arm 22 to the non-clamping position; a retainer 23 disposed partially in an accommodating hole 214 in a top surface of an opposite end of the bottom seat 21 and connected pivotally to the bottom seat 21 by a second pivot pin 27 extending through two opposite sidewalls 213 defining the accommodating hole 214 therebetween; and a second torsion spring 25 disposed in the accommodating hole 214 between the retainer 23 and the bottom seat 21 for biasing the retainer 23 toward the retaining position. In this embodiment, the first and second torsion springs 24, 25 are double torsion springs.

Figure 4:
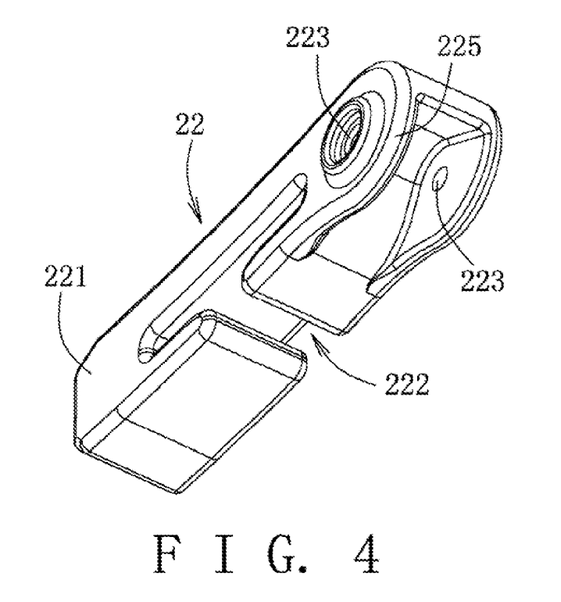
FIG. 4 is a bottom perspective view illustrating a rotatable clamping arm of the safety-belt clamping device of the first preferred embodiment.

With further reference to FIG. 4, a pivot end 225 of the rotatable clamping arm 22 is straddled on the pivot seat 211, and has two parallel sidewalls each formed with a pivot hole 223 permitting extension of the first pivot pin 26 therethrough. Two resilient arms of the first torsion spring 24 are sleeved respectively on the first shaft tubes 216 of the sidewalls of the pivot seat 211 so as to rotate about the shaft tubes 216. The free end 221 of the rotatable clamping arm 22 has an end surface formed with an engaging hole 224. The rotatable clamping arm 22 has a through hole 222 disposed at a bottom side thereof and permitting the safety belt 3 to extend therethrough. In a situation where the safety belt 3 extends through the through hole 222, when the rotatable clamping arm 22 is rotated, the position of the safety belt 3 relative to the seat base 1 is changed.

The retainer 23 has a retainer body 230, a retaining hook 231 extending from an upper end of the retainer body 230 for engaging the engaging hole 224, two shaft tubes 232 extending from a lower end of the retainer body 230 away from each other, and a through hole unit 232' extending through the retainer body 230 and the shaft tubes 232 and allowing for extension of the second pivot pin 27, so that the retainer 23 is disposed pivotally within the accommodating hole 214. Two resilient arms of the second torsion spring 25 are sleeved respectively on the shaft tubes 232. In this embodiment, the retainer 23 further has a reinforcing member 233 strengthening the retainer 23. The reinforcing member 233 is sleeved rotatably on the second pivot pin 27, and is connected to the retainer body 230 so as to rotate synchronously with the retainer body 230 about the second pivot pin 27.

Figure 5:
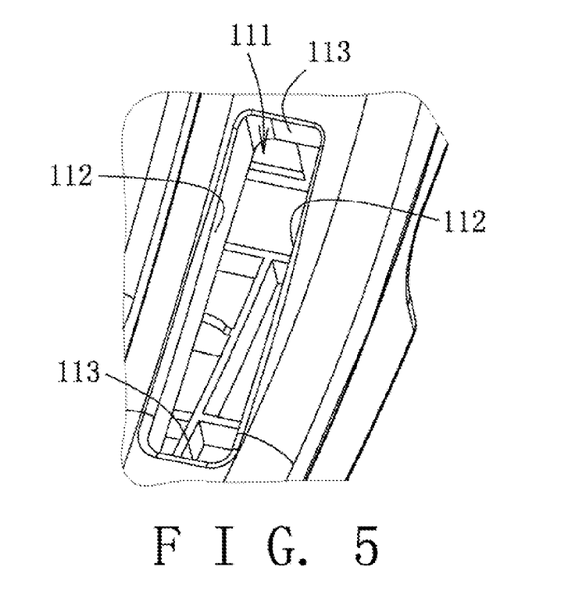
FIG. 5 is a fragmentary perspective view of the first preferred embodiment, illustrating a mounting groove.
Figure 6:
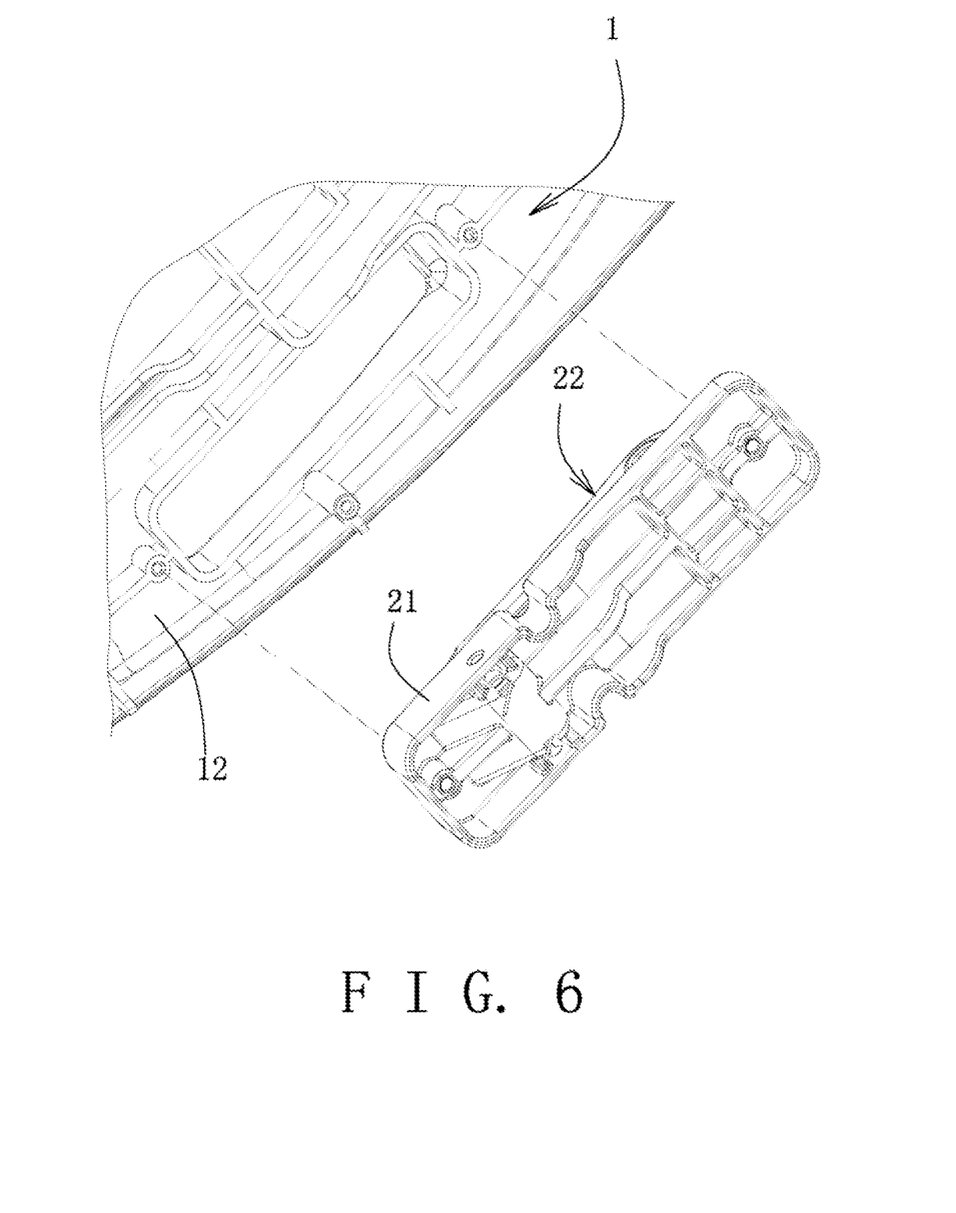
FIG. 6 is a fragmentary exploded bottom perspective view of the first preferred embodiment.

With further reference to FIGS. 5 and 6, the upper housing 13 has a top surface 11 that has two mounting grooves 111 formed in two opposite sides thereof. The number of the mounting grooves 111 corresponds to that of the safety-belt clamping devices 2, and may be increased or reduced. Each mounting groove 111 is defined by two opposite sidewalls 112 and two end walls 113 connected between the sidewalls 112. The bottom seat 21 is disposed outwardly of the mounting groove 111, i.e., on a bottom surface 12 of the upper housing 13. The rotatable clamping arm 22 and the retainer 23 are disposed within the mounting groove 111. When the rotatable clamping arm 22 is disposed at the non-clamping position, the free end 221 of the rotatable clamping arm 22 projects from the top surface 11 so as to allow the safety belt 3 to extend through the through hole 222 of the rotatable clamping arm 22. When the rotatable clamping arm 22 is disposed at the clamping position, it is located wholly under the top surface 11. At this position, if the safety belt 3 does not extend through the through hole 222, the rotatable clamping arm 22 can be confined within the mounting groove 111 by the retainer 23 to maintain connection between the seat body and the seat base 1, and if the safety belt 3 extends through the through hole 222, the rotatable clamping arm 22 can be retained by the retainer 23, and the safety belt 3 can be clamped between the rotatable clamping arm 22 and the sidewalls 112 so as not to move relative to the rotatable clamping arm 22 and the sidewalls 112. As such, the position of the safety belt 3 relative to the seat base 1 can be changed by rotating the rotatable clamping arm 22.

Figure 7:
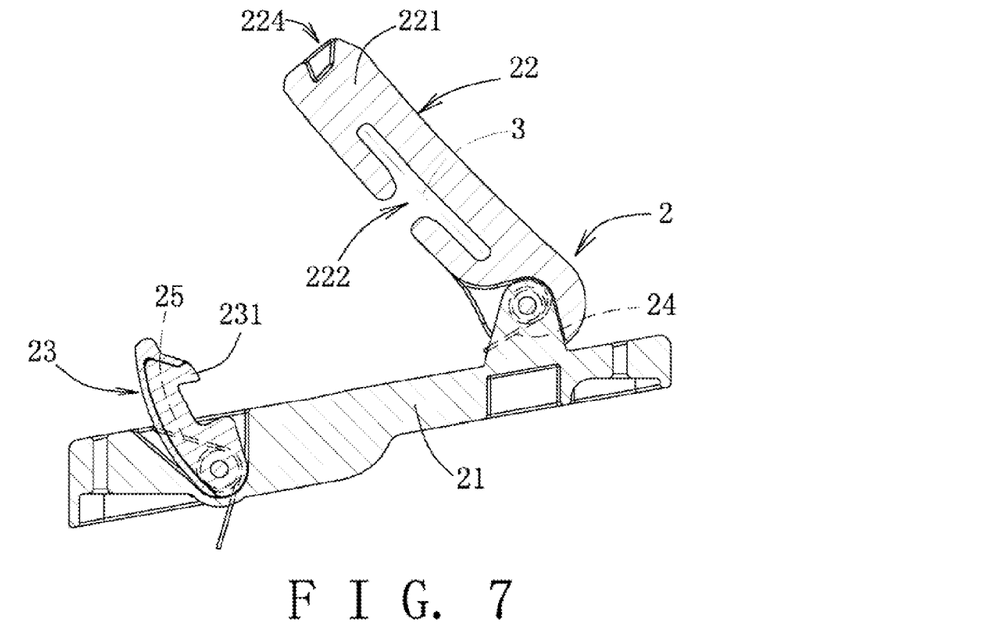
FIG. 7 is a sectional view of the safety-belt clamping device of the first preferred embodiment, illustrating a non-clamping position of the rotatable clamping arm and a non-retaining position of a retainer.
Figure 8:
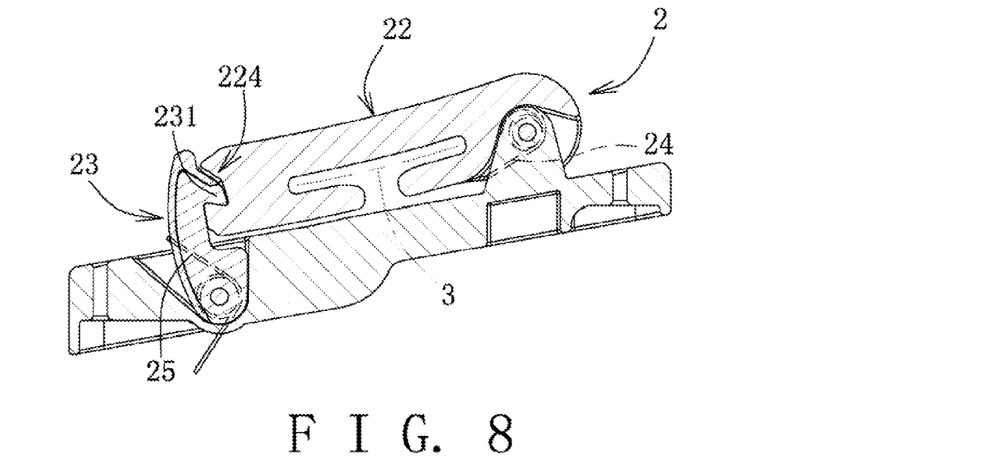
FIG. 8 is a view similar to FIG. 7 but illustrating a clamping position of the rotatable clamping arm and a retaining position of the retainer.

With further reference to FIGS. 7 and 8, when it is desired to fasten the seat base 1 to the car seat, the free end 221 of the rotatable clamping arm 22 is moved upwardly to remove the rotatable clamping arm 22 from the clamping position, so that the rotatable clamping arm 22 is biased to the non-clamping position by the first torsion spring 24. At this time, the safety belt 3 is able to extend through the through holes 222 of the rotatable clamping arms 22. Subsequently, the free end 221 of the rotatable clamping arm 22 can be rotated toward the bottom seat 21. When the rotatable clamping arm 22 reaches the clamping position, the retaining hook 231 of the retainer 23 engages the engaging hole 224 of the rotatable clamping arm 22 to fasten the seat base 1 to the car seat by retaining the safety belt 3 with the safety-belt clamping device 2 and the seat base 1.

When it is desired to remove the seat base 1 from the car seat, the retainer 23 is operated to remove the engaging hook 231 of the retainer 23 from the engaging hole 224. Hence, the rotatable clamping arm 22 is biased by the first torsion spring 24 to the non-clamping position, thereby allowing for removal of the safety belt 3.

FIGS. 9 to 13 show the second preferred embodiment of a child safety seat according to this invention, which is different from the first preferred embodiment in the following.

Figure 9:
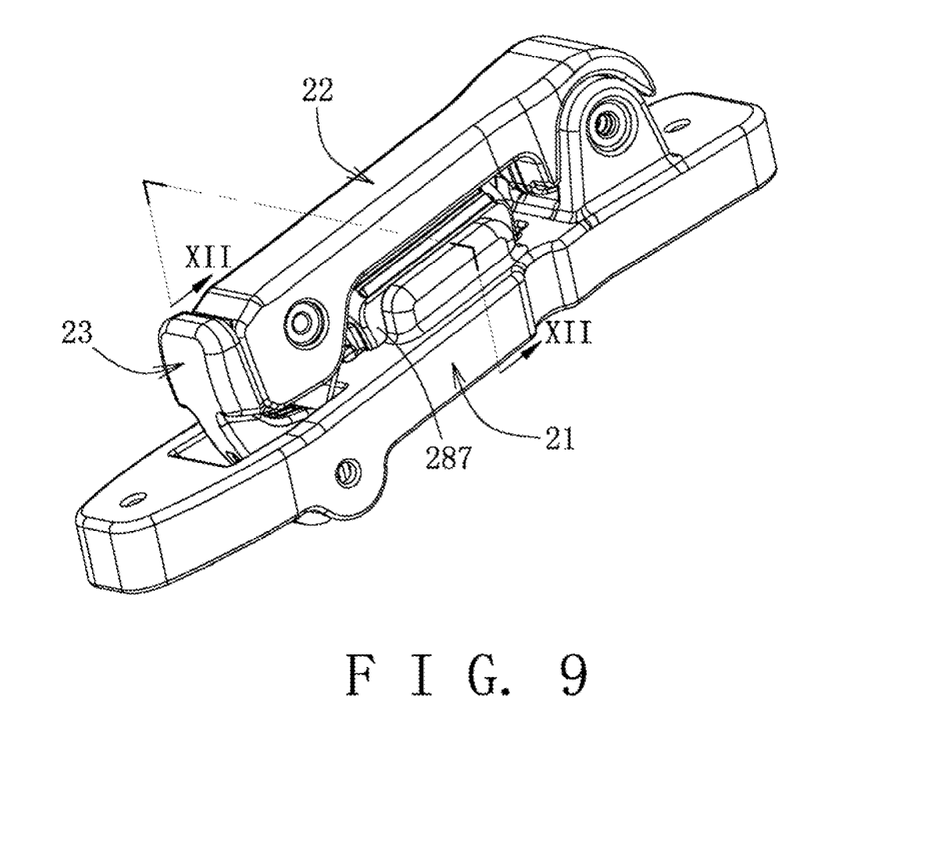
FIG. 9 is a perspective view of a safety-belt clamping device of the second preferred embodiment of a child safety seat according to this invention.
Figure 10:
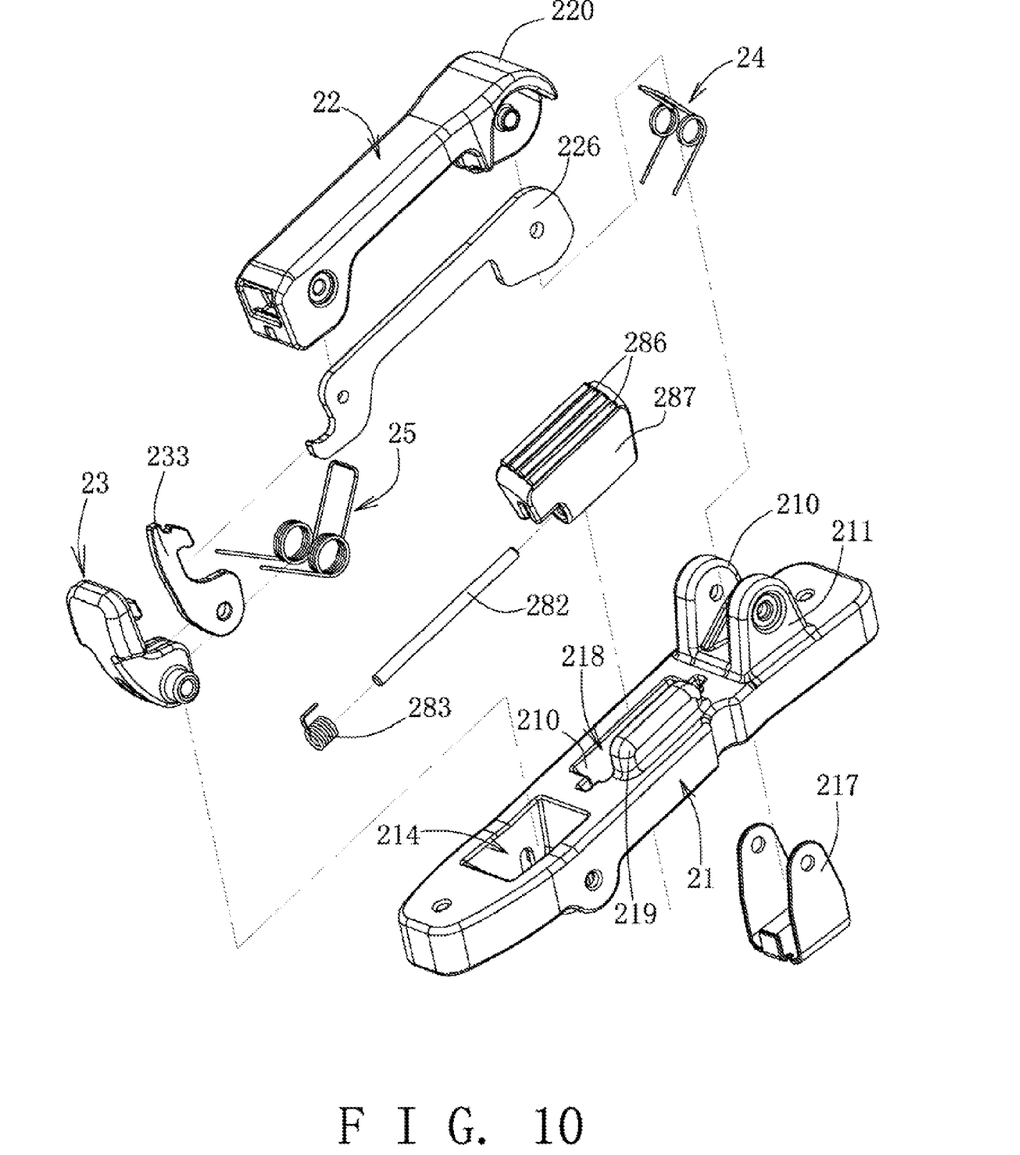
FIG. 10 is an exploded perspective view of the safety-belt clamping device of the second preferred embodiment.
Figure 11:
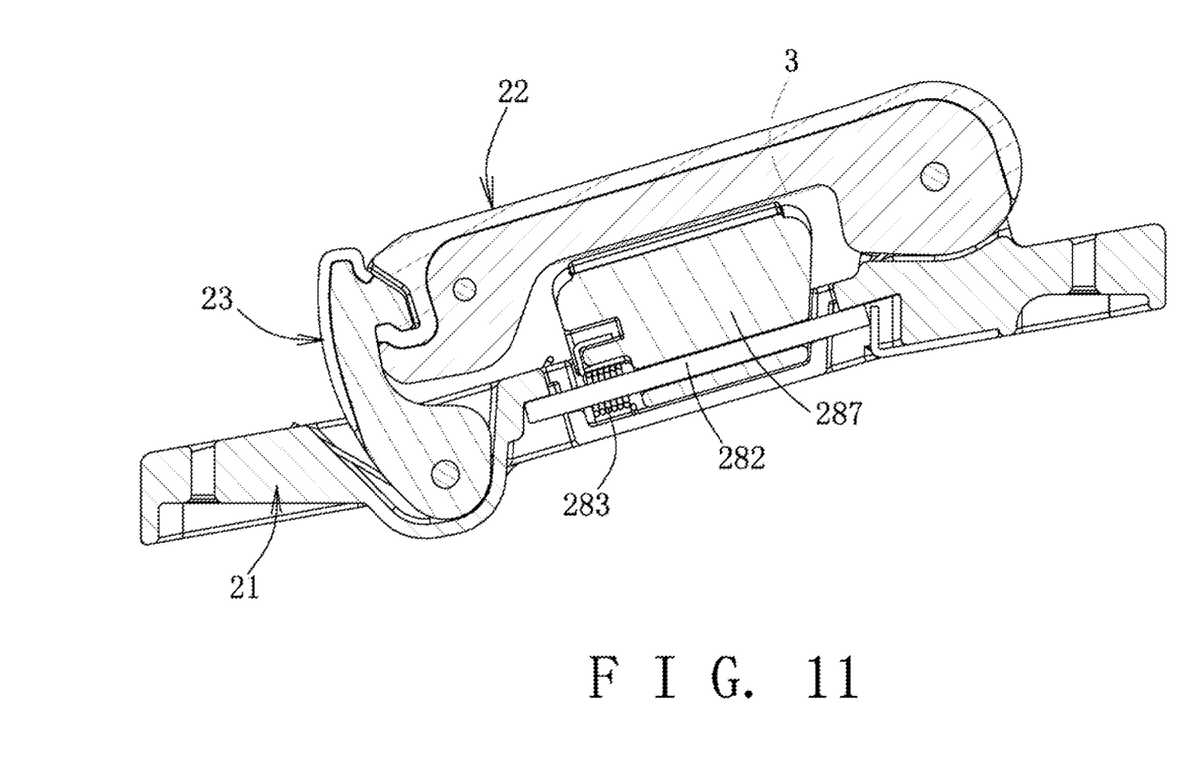
FIG. 11 is a sectional view of the safety-belt clamping device of the second preferred embodiment.

In this embodiment, each bottom seat 21 further includes a slot 218 disposed between the pivot seat 211 and the accommodating hole 214. Each safety-belt clamping device 2 further includes a pressing block 287 connected pivotally between two opposite end walls defining the slot 218 by a pivot pin 282, and a torsion spring 283 sleeved on the pivot pin 282 and disposed between the pressing block 287 and the bottom seat 21 for biasing the pressing block 287. The rotatable clamping arm 22 includes an arm body 220 and a reinforcing member 226 for strengthening the rotatable clamping arm 22. The pivot seat 211 includes a seat body 211 and a reinforcing member 217 for strengthening the pivot seat 211.

Figure 12:
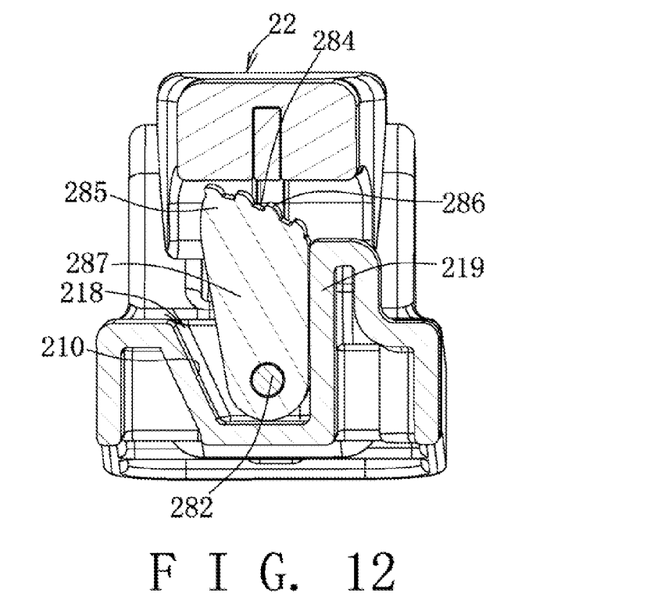
FIG. 12 is a sectional view taken along line XII-XII in FIG. 9.
Figure 13:
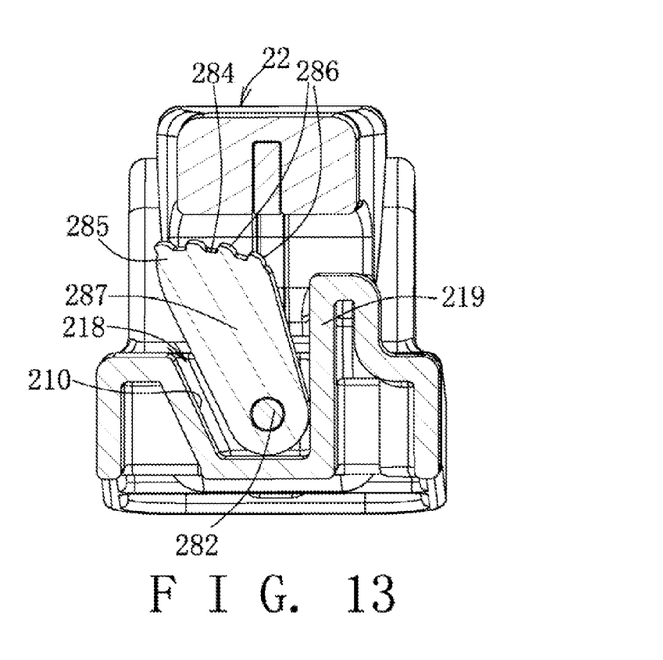
FIG. 13 is a view similar to FIG. 12, illustrating that a pressing block is driven to rotate.

The safety belt 3 extends above the pressing block 287, and is clamped between the rotatable clamping arm 22 and the pressing block 287 and between the rotatable clamping arm 22 and the sidewalls 112 (see FIG. 5) defining the mounting groove 111 (see FIG. 5). With particular reference to FIGS. 12 and 13, a top surface 284 of the pressing block 287 has a plurality of engaging portions 285 contactable with the rotatable clamping arm 22 for clamping the safety belt 3 between the rotatable clamping arm 22 and the engaging portions 285. The engaging portions 285 are spaced apart from the pivot pine 282 by a distance that is increased gradually from a side of the pressing block 287 to an opposite side of the pressing block 287, so as to increase friction between the pressing block 287 and the safety belt 3. In this embodiment, the top surface 284 is formed with a plurality of ribs having top ends constituting the engaging portions 285, respectively.

The slot 218 is defined by a wall having an inclined wall portion 210 located near a side of the pressing block 287, and a vertical wall portion 219 located near an opposite side of the pressing block 287. The pressing block 287 is biased by the torsion spring 283 to contact the vertical wall portion 219. When the safety belt 3 is clamped between the rotatable clamping arm 22 and the pressing block 287, the pressing block 287 is spaced apart from the inclined wall portion 210, and is thus allowed to rotate toward the inclined wall portion 210.

To remove or fasten the child safety seat with respect to the car seat, the second preferred embodiment is operated in a manner similar to that of the first preferred embodiment.

When loosening and tightening of the safety belt 3 are intended, with particular reference to FIG. 13, the safety belt 3 can be pulled to rotate the pressing block 287 away from the vertical wall portion 219 so that the distance between the rotatable clamping arm 22 and the engaging portions 285 is increased to allow for adjustment of the safety belt 3. When the safety belt 3 is released, the pressing block 287 is biased by the torsion spring 283 toward the vertical wall portion 219 to press the safety belt 3 against the rotatable clamping arm 22.

Figure 14:
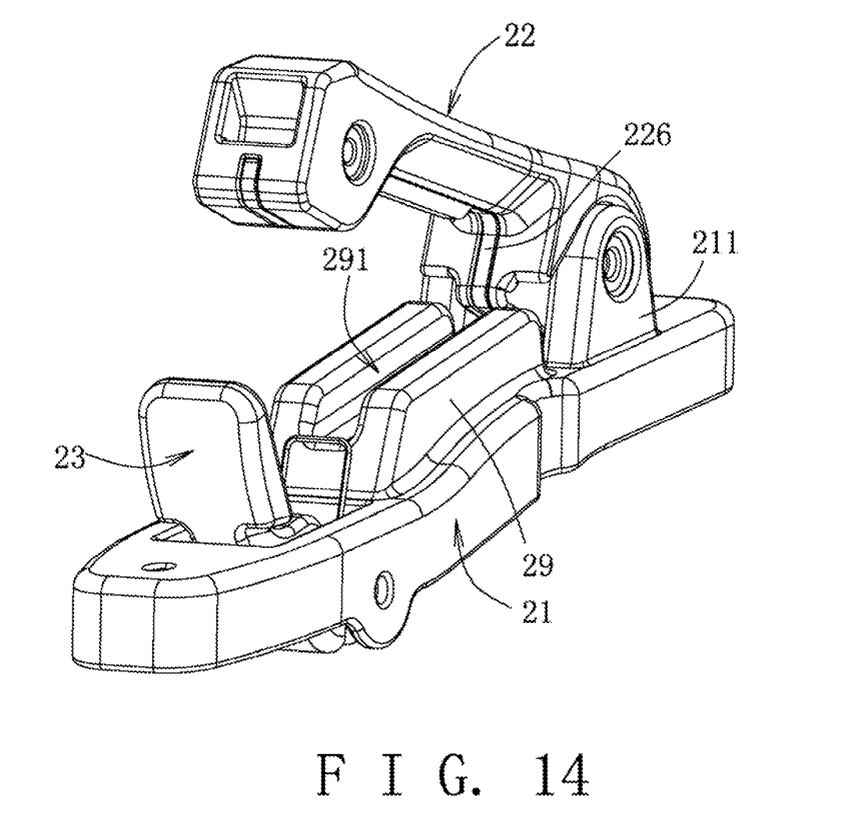
FIG. 14 is a perspective view of a safety-belt clamping device of the third preferred embodiment of a child safety seat according to this invention.
Figure 15:
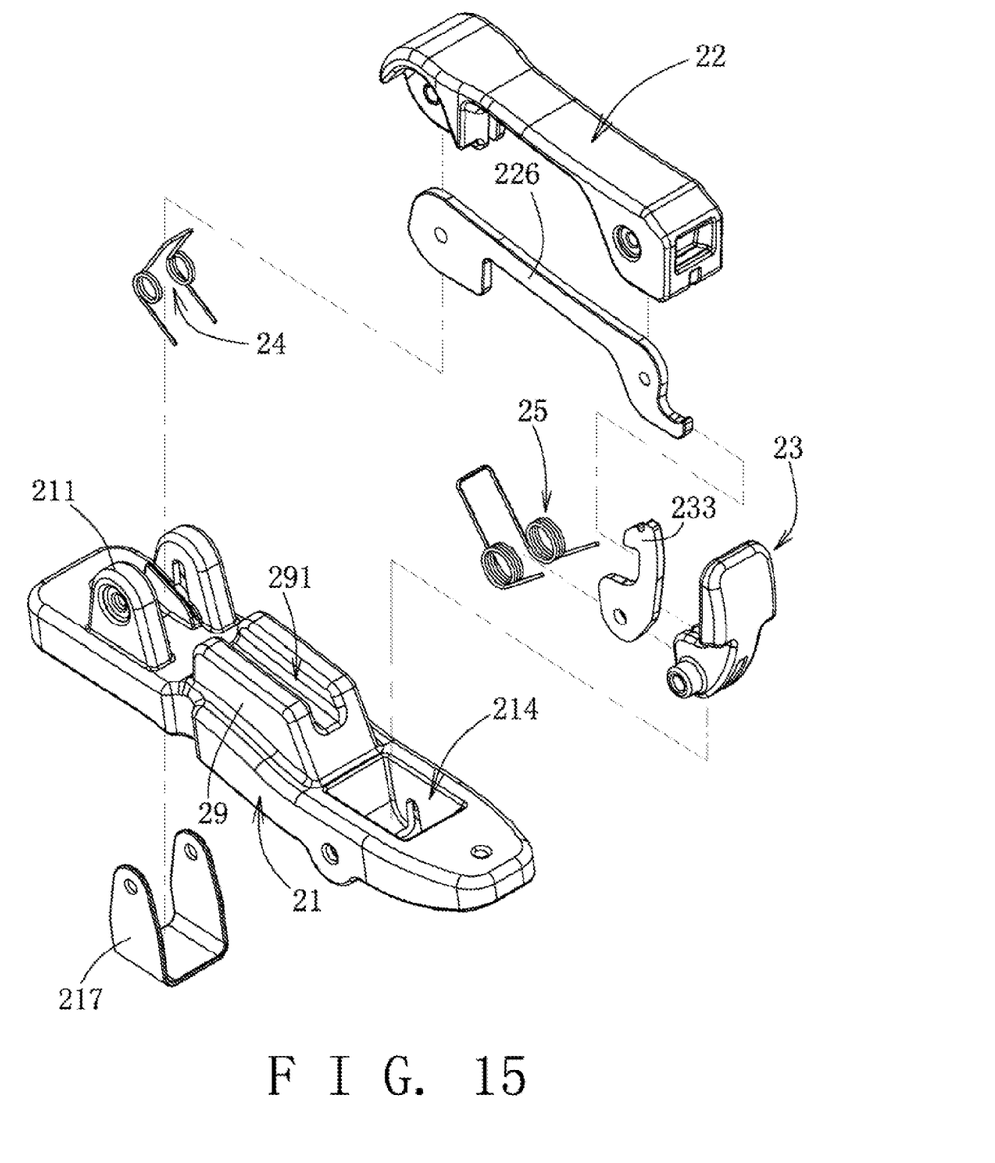
FIG. 15 is an exploded perspective view of the safety-belt clamping device of the third preferred embodiment.

FIGS. 14 and 15 show the third preferred embodiment of a child safety seat according to this invention, which is similar to the first preferred embodiment. Unlike the first preferred embodiment, the safety-belt clamping device 2 further includes a clamping block 29 extending from the bottom seat 21, so as to permit the safety belt 3 to be clamped between the rotatable clamping arm 22 and a top end of the clamping block 29 and between the rotatable clamping arm 22 and the sidewalls 112 defining the mounting groove 111. A top end of the clamping block 29 has a recess 291 that is open toward the rotatable clamping arm 22. When the safety belt 3 is clamped between the rotatable clamping arm 22 and the top end of the clamping block 29, the safety belt 3 is pressed into the recess 291 by the reinforcing member 226.

Removing and fastening operation of this embodiment is similar to the first preferred embodiment, and will not be further described herein for brevity.

In view of the above, the safety belt 3 can be easily fastened to and removed from the car seat by the safety-belt clamping device 2. Furthermore, the safety-belt clamping device 2 is concealed within the seat base 1, and can fasten the child safety seat effectively to the car seat. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A child safety seat comprising a seat base and a safety-belt clamping device disposed on said seat base, said child safety seat being disposed to a car seat by a safety belt;
   wherein said safety-belt clamping device includes a bottom seat, a rotatable clamping arm connected pivotally to an end of said bottom seat, and a retainer mounted to an opposite end of said bottom seat and retaining releasably a free end of said rotatable clamping arm thereon; and
   wherein said seat base has a mounting groove defined by two opposite sidewalls and two opposite end walls connected between said sidewalls, said bottom seat being disposed fixedly on said seat base, said rotatable clamping arm and said retainer being disposed within said mounting groove such that, when said rotatable clamping arm is retained on said retainer, the safety belt is clamped between said rotatable clamping arm and said sidewalls.

2. The child safety seat as claimed in claim 1, wherein said seat base has a bottom surface, and a portion of said bottom seat aligned with said mounting groove is secured to said bottom surface of said seat base.

3. The child safety seat as claimed in claim 2, wherein an end of said bottom seat includes a pivot seat, said free end of said rotatable clamping arm being formed with an engaging hole, said rotatable clamping arm being connected pivotally to said pivot seat and being pivotable relative to said bottom seat between a clamping position whereat said free end of said rotatable clamping arm is proximate to said bottom seat, and a non-clamping position whereat said free end of said rotatable clamping arm is distal from said bottom seat, said retainer being mounted pivotally to an opposite end of said bottom seat and being pivotable relative to said bottom seat between a retaining position whereat said retainer engages said engaging hole, and a non-retaining position whereat said retainer is disengaged from said engaging hole.

4. The child safety seat as claimed in claim 3, wherein said end of said bottom seat, on which said retainer is mounted pivotally to, is formed with an accommodating hole, said retainer having a lower end disposed pivotally in said accommodating hole, and an upper end formed with a retaining hook for engaging said engaging hole.

5. The child safety seat as claimed in claim 4, wherein said safety-belt clamping device further includes a first torsion spring disposed between said bottom seat and said rotatable clamping arm for biasing said rotatable clamping arm toward said non-clamping position, and a second torsion spring disposed in said accommodating hole between said retainer and said bottom seat for biasing said retainer toward said retaining position.

6. The child safety seat as claimed in claim 5, wherein said retainer includes a retaining body formed with said retaining hook, and a reinforcing member connected to said retaining body and pivotable synchronously with said retainer body relative to said bottom seat.

7. The child safety seat as claimed in claim 1, wherein said rotatable clamping arm has a through hole formed therethrough and adapted to allow for extension of the safety belt.

8. The child safety seat as claimed in claim 2, wherein said free end is formed with an engaging hole for engaging said retainer.

9. The child safety seat as claimed in claim 1, wherein said safety-belt clamping device further includes a clamping block extending from said bottom seat, so as to permit the safety belt to be clamped between said rotatable clamping arm and a top end of said clamping block and between said rotatable clamping arm and said sidewalls.

10. The child safety seat as claimed in claim 9, wherein said top end of said clamping block has a recess that is open toward said rotatable clamping arm such that, the safety belt is pressed into said recess when clamped between said rotatable clamping arm and said top end of said clamping block.

11. The child safety seat as claimed in claim 1, wherein said safety-belt clamping device further includes a pressing block connected pivotally to said bottom seat, and a torsion spring for biasing said pressing block, such that the safety belt extends above said pressing block, and is clamped between said rotatable clamping arm and said pressing block, and between said rotatable clamping arm sand said sidewalls.

12. The child safety seat as claimed in claim 11, wherein said safety-belt clamping device further includes a pivot pin disposed on said bottom seat and extending through said pressing block, said pressing block having a plurality of engaging portions contactable with said rotatable clamping arm and spaced apart from said pivot pin by a distance that is increased gradually from a side of said pressing block to an opposite side of said pressing block.

13. The child safety seat as claimed in claim 12, wherein said bottom seat includes a pivot seat disposed at an end thereof and connected pivotally to said rotatable clamping arm, and an accommodating hole disposed at an opposite end thereof, said retainer having a lower end disposed pivotally in said accommodating hole.

14. The child safety seat as claimed in claim 13, wherein said bottom seat further includes a slot disposed between said pivot seat and said accommodating hole, said pressing block being disposed pivotally within said slot.

15. The child safety seat as claimed in claim 14, wherein said slot is defined by a wall having an inclined wall portion located at a side of said pressing block, and a vertical wall portion located at an opposite side of said pressing block, said pressing block being biased to contact said vertical wall portion.

16. The child safety seat as claimed in claim 12, wherein said pressing block further has a top surface that is formed with a plurality of ribs, said ribs having top ends constituting said engaging portions, respectively.

* * * * *